March 5, 1929.　　　G. S. DONHAM　　　1,704,465
WHEEL SCRAPER
Filed Sept. 19, 1927　　　2 Sheets-Sheet 1
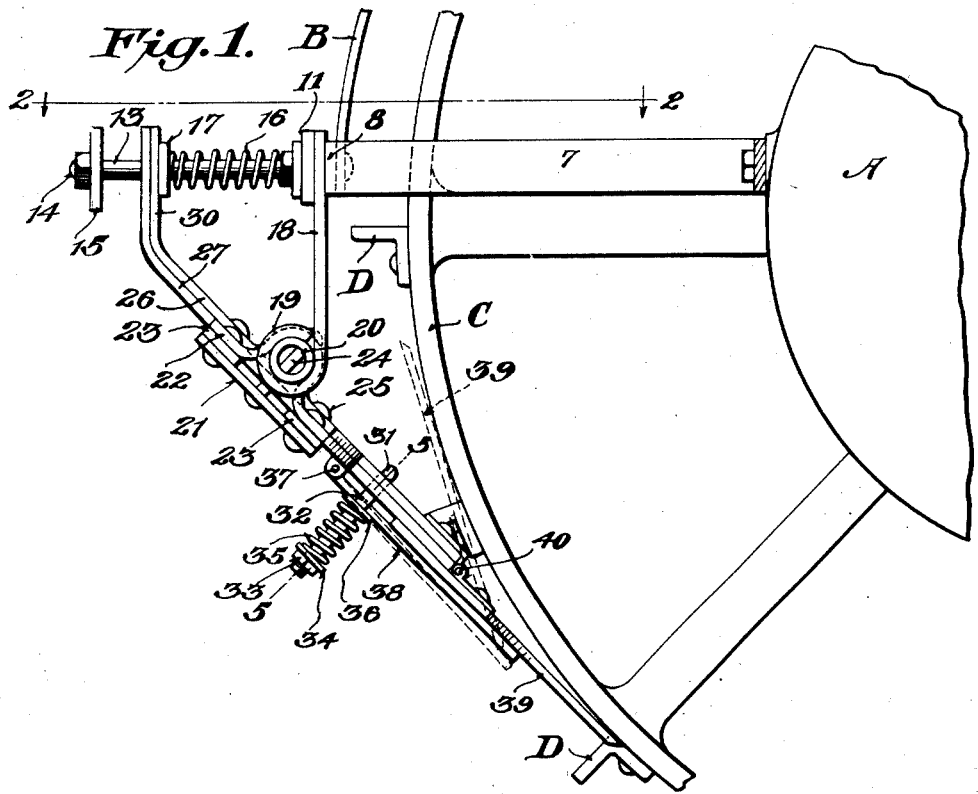
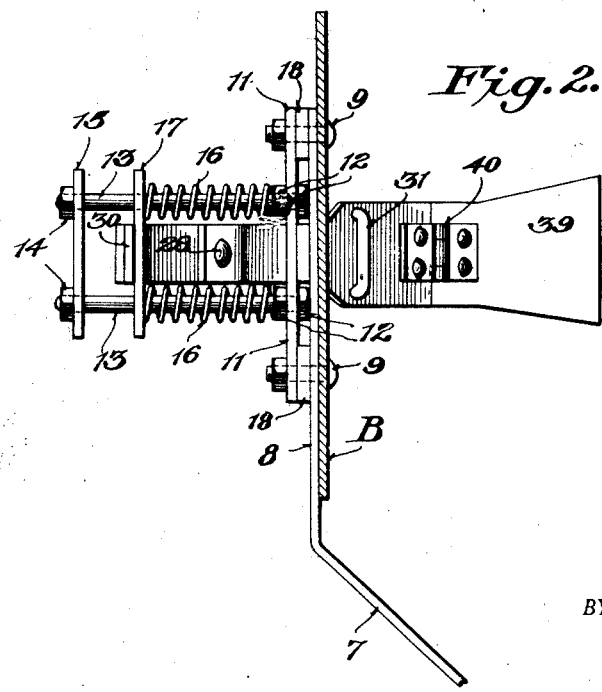
INVENTOR.
George S. Donham,
BY Royal E. Burnham,
ATTORNEY.

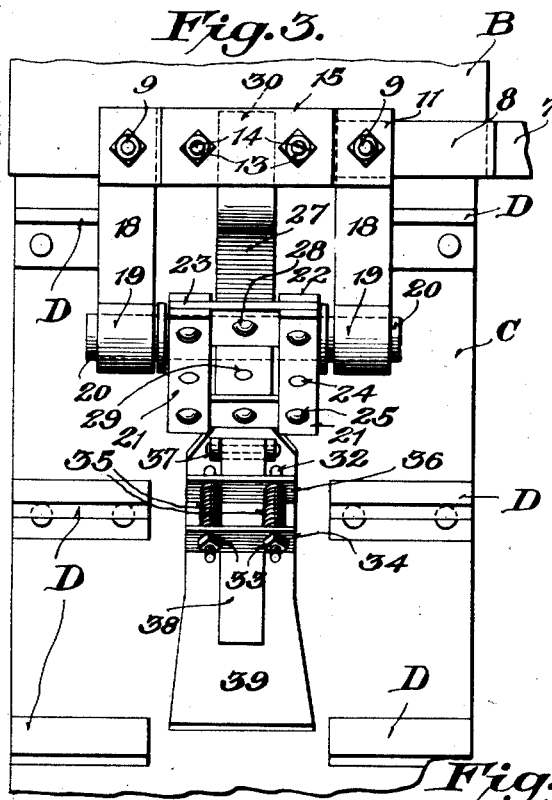

Patented Mar. 5, 1929.

1,704,465

UNITED STATES PATENT OFFICE.

GEORGE S. DONHAM, OF JOHNSON COUNTY, IOWA.

WHEEL SCRAPER.

Application filed September 19, 1927. Serial No. 220,509.

This invention relates to a device for preventing the accumulation of mud, dirt, and other matter having a tendency to adhere to the drive and other wheels of tractors, agricultural implements, and other machines.

It is an object of the invention to provide a scraping device for that purpose that can be mounted on machines already in use without making any material changes in them, and that will hold the scraper-blade yieldingly against the wheel.

The device exemplified herein is adapted particularly for use with traction-wheels having rows of spade-lugs or the like on their peripheries and to maintain the blade against the wheel-tread between those rows. For use with wheels of that character, the device is so arranged that the blade is permitted to trip or turn over when it encounters a stone or other material securely lodged between the lugs, whereby breakage of parts is avoided.

When considered with the description herein, the characteristics of the invention are apparent from the accompanying drawings, forming part hereof, wherein the device is disclosed, for purposes of illustration, in association with a drive-wheel of a tractor.

Although the disclosures herein exemplify what now is considered to be a preferable embodiment of the invention, it is to be understood that it is not the intention to be limited necessarily thereto in interpretation of the claims, as modification and adaptations within the limits of the claims can be made without departing from the nature of the invention.

Like reference-characters refer to corresponding parts in the views of the drawings, of which—

Fig. 1 is a side elevation of the device in association with a wheel partly shown;
Fig. 2 is a top view;
Fig. 3 is a rear elevation;
Fig. 4 is a front view;
Fig. 5 is a section on the line 5—5, Fig. 1;
Fig. 6 is a fragmentary side view.

In the drawings, A designates the transmission-casing or other fixed part of a vehicle, B a wheel-guard, and C a wheel having rows of lugs D on its periphery.

A brace member 7 is secured at one end to the transmission-casing or other suitable part of the vehicle, and its other end portion 8 extends across the outer side of the wheel-guard.

Bolts 9 extend through the end portion 8, the guard, and a transverse plate 11 and hold the plate securely in place.

Opposed nuts 12 secure to the plate two elongated members or bolts 13 extending outwardly therefrom and having nuts or other suitable abutments 14. A transverse stop member 15 is held on the members 13 by the abutments. Coil-springs 16 on the members 13 press a plate 17 slidable thereon toward the stop member.

Two members 18 are held between the brace part 8 and the plate 11 by bolts 9, which pass therethrough. The members 18 extend downwardly, and at their lower ends are formed as loops 19, which are disposed around and firmly hold a rockable transverse shaft 20. A frame comprising side members 21 disposed under the shaft, upper side members 22 disposed thereabove, and end transverse members 23 disposed between the members 21 and 22, is mounted on the shaft, the parts being held together by rivets or other suitable fasteners 24 extending through the side members and the shaft and by rivets or other suitable fasteners 25 extending through the side and transverse members.

An elongated bar, comprising an upper plate 26 disposed above the shaft 20 and a lower plate 27 extending under that shaft, is secured to the frame by fasteners 28 extending therethrough and through the transverse members 23 under which it is disposed, and a fastener 29 also extending through the bar-plates and through the shaft. The upper portion of the bar is bent or deflected from its plane, as shown at 30, and is disposed between the stop member 15 and the spring-pressed plate 17.

A U-shaped member has its upper connecting part 31 disposed above the bar 26—27 near its lower end, and shanks 32 thereof extend outwardly through the bar. Nuts or other suitable abutments 33 on the shanks hold a transverse plate 34 thereon, and coil-springs 35 are disposed between that plate and a presser-plate 36. Hingedly mounted on the bar at 37, a plate 38 extends above the presser-plate and beyond the end of the bar. A scraper-blade 39 is hinged between its ends at 40 on the end of the bar; its upper portion normally is disposed between the plate 38 and the bar; and its lower edge normally is held against the periphery of the wheel between the lugs by the springs 16.

When a stone or other hard material becomes lodged between the wheel-lugs, and thus offers to the scraper-blade an obstruction that is not removable thereby, the blade, on encountering the obstruction, turns over on its hinge and swings the plate 38 against the spring 35, the springs 16 permitting the outward movement of the bar incident to the swing of the blade. After the obstruction has passed, the blade may be returned to its normal position by hand, and the obstruction is removed in any suitable manner. Consequently, with the scraper-blade so mounted, there is no danger of either breaking the scraper device or stopping rotation of the wheel with which it is associated when the blade encounters an obstruction it cannot remove.

What I claim as my invention, and desire to secure by Letters Patent, is—

1. A wheel-scraper device comprising a member swingably mounted between its ends, a scraper-blade swingably mounted on one end of said member, yieldable means normally retaining said blade in scraping position, and a spring acting on the other end portion of said member to press said blade against a wheel.

2. A wheel-scraper device comprising a swingably-mounted member, a scraper-blade swingably mounted between its ends on said member, a plate swingably mounted on said member and extending over said blade, a spring pressing said plate against said blade, and a spring acting on said member to press said blade against a wheel.

3. A wheel-scraper device comprising a support adapted to be attached to a vehicle, a shaft carried by said support, a swingable bar mounted between its ends on said shaft, a scraper-blade swingably mounted on one end of said bar, a swingable spring-pressed member holding said blade normally in scraping position, and a spring acting on the other end of said bar to press said blade against a wheel.

In testimony whereof I affix my signature.

GEORGE S. DONHAM.